(12) United States Patent
Chen et al.

(10) Patent No.: US 11,254,396 B2
(45) Date of Patent: Feb. 22, 2022

(54) MARINE SUPPORT COLUMN STRUCTURE WITH POWER GENERATION

(71) Applicant: ZHEJIANG OCEAN UNIVERSITY, Zhoushan (CN)

(72) Inventors: Zhengshou Chen, Zhoushan (CN); Meng Sun, Zhoushan (CN); Junkai Gao, Zhoushan (CN); Yan Chen, Zhoushan (CN); Yingxiao Xie, Zhoushan (CN); Qin Wang, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 0 days.

(21) Appl. No.: 17/060,533

(22) Filed: Oct. 1, 2020

(65) Prior Publication Data

US 2021/0107604 A1 Apr. 15, 2021

(51) Int. Cl.
| | |
|---|---|
| *B63B 35/00* | (2020.01) |
| *F03D 9/32* | (2016.01) |
| *B63B 17/00* | (2006.01) |
| *F03B 13/18* | (2006.01) |
| *F03D 3/00* | (2006.01) |

(52) U.S. Cl.
CPC .............. *B63B 35/00* (2013.01); *B63B 17/00* (2013.01); *F03B 13/18* (2013.01); *F03D 3/00* (2013.01); *F03D 9/32* (2016.05); *B63B 2209/14* (2013.01); *B63B 2209/20* (2013.01); *F05B 2210/16* (2013.01)

(58) Field of Classification Search
CPC ..... B63B 35/00; B63B 17/00; B63B 2209/14; B63B 2209/20; F03D 9/32; F03D 3/00; F03D 3/005; F03B 13/18; F05B 2210/16
See application file for complete search history.

(56) References Cited

U.S. PATENT DOCUMENTS 10,539,115 B1 * 1/2020 Rodrigues ............... F03D 3/068

\* cited by examiner

*Primary Examiner* — Viet P Nguyen
(74) *Attorney, Agent, or Firm* — W&KIP

(57) ABSTRACT

The present disclosure belongs to the technical field of power generators, and in particular relates to a marine support column structure with power generation function. The support column structure solves technical problems that existing marine power generators can only generate power with single energy and have few functions and so on. The marine support column structure with power generation function includes a column body. The support column structure of the present disclosure is capable of generating power with sea wind and waves, and is further capable of serving as a guardrail.

8 Claims, 5 Drawing Sheets

MARINE SUPPORT COLUMN STRUCTURE WITH POWER GENERATION

CROSS-REFERENCE TO RELATED APPLICATIONS

This application claims priority to Chinese Patent Application No. 201910966776.1 with a filing date of Oct. 12, 2019. The content of the aforementioned application, including any intervening amendments thereto, are incorporated herein by reference.

TECHNICAL FIELD

The present disclosure belongs to the technical field of generators, and in particular relates to a marine support column structure with power generation function.

BACKGROUND

Power generators are widely used in industrial and agricultural production, national defense, science and technology and daily life. Many forms of power generators all work based on an electromagnetic induction law and an electromagnetic force law. Therefore, the power generators are generally constructed on the following principle: a magnetic circuit and an electric circuit for mutually performing electromagnetic induction are constructed using an appropriate magnetically-conductive material and an appropriate electrically-conductive material respectively to generate electromagnetic power so as to achieve the purpose of energy conversion.

Electric energy shortage often occurs to ships travelling on the sea. But the sea is rich in energy, and therefore, it is necessary to design a power generating device that may be used on a ship so as to solve the problem of electric energy shortage.

Chinese patent (Publication No.: CN208401690U; Publication Date: Jan. 18, 2019) discloses a marine hydroelectric generator including a fixing device and a power generating device. The fixing device is disposed at the left side of the power generating device and fixedly connected with the power generating device through bolts. In the marine hydroelectric generator, an electromagnetic speed changer presented in an inverted "L" shape is disposed and fixedly connected with a rear end of a bearing seat so as to generate a constant magnetic field using a rotor, and thus a magnetic circuit and an electric circuit for mutually performing electromagnetic induction are constructed to generate electromagnetic power, achieving energy conversion.

In the above patent document, the marine hydroelectric generator produces no frictional force and thus has no mechanical wear in a power generation process; at the same time, automation is easily controlled and realized with an electric current as a control medium, bringing no noise pollution and wide application prospect. However, the device can only generate power with sea waves, and cannot fully utilize other energies on the sea; further, the device can only be used as a power generator and has no other functions.

SUMMARY

To solve the above problems of the prior art, the present disclosure provides a marine support column structure with power generation function. The technical problems to be solved by the present disclosure are: how to enable a marine power generating device to generate power with different energies and increase the functions of the power generating device.

The objectives of the present disclosure may be achieved by the following technical solution.

A marine support column structure with power generation function includes a column body. A power generator having a rotor shaft is disposed at one end of the column body, an end of the rotor shaft and one end of the column body are fixedly connected to allow the rotor shaft and the column body to be coaxially disposed, several first connecting rods are disposed at one end of the column body connected with the power generator and disposed along a radial direction of the column body, and all of the first connecting rods are distributed uniformly in a spacing along a circumferential direction of the column body. A driving shaft is coaxially and fixedly connected at the other end of the column body, a sleeve pipe is rotatably sleeved outside the driving shaft, and several second connecting rods are distributed circumferentially and uniformly at an outer circumferential surface of the sleeve pipe and disposed along a radial direction of the sleeve pipe. A third connecting rod is movably connected at an outer end of each second connecting rod. Several strip-shaped blades are distributed at an outer perimeter of the column body along the circumferential direction of the column body, and a length direction of the blade is consistent with an axial direction of the column body. An inner side surface of the blade is a flat surface, and an outer side surface of the blade is a circular arc surface. The circular arc surfaces of all blades can be connected to enclose into a complete cylindrical surface. The number of the blades is equal to the numbers of the first connecting rods and the third connecting rods, the blade, the first connecting rod and the third connecting rod are disposed correspondingly, one end of the blade is hinged with a corresponding first connecting rod, and the other end of the blade is hinged with a corresponding third connecting rod.

The support column structure works based on the following principle: during its use, the support column structure is placed on a ship hull or a sea surface, the blades are then unfolded to allow sea wind or waves to act on and drive the blades to rotate, and a middle portion of the blade drives the column body to rotate through the first connecting rod; one side of the blade drives the sleeve pipe to rotate through the second connecting rod and the third connecting rod, the sleeve pipe drives the driving shaft and the column body to rotate, and the column body drives the power generator to generate power through the rotor shaft connected thereto. The structure can generate power with wind energy or wave energy, and thus can fully utilize the energies on the sea.

In the above marine support column structure with power generation function, the number of the blades, the number of the first connecting rods and the number of the third connecting rods are all four, one end of the first connecting rod is fixedly connected at an outer circumferential surface of the column body close to an end, the other end of the first connecting rod is rotatably connected on the blade through a first rotary shaft, and the first rotary shaft is located at a middle position of the blade in a width direction. The middle portion of the blade is movably connected with the column body through the first connecting rod and the first rotary shaft to facilitate driving the column body to rotate.

In the above marine support column structure with power generation function, there are four second connecting rods distributed uniformly in a spacing at the outer circumferential surface of the column body, an inner end of the second connecting rod is fixedly connected with the sleeve pipe, and an outer end of the second connecting rod is pivotally connected with one end of the third connecting rod through an inserted second rotary shaft; the other end of the third connecting rod is movably connected with the blade through a third rotary shaft, and the third rotary shaft is located close to a side of the blade along the width direction. The second connecting rod is fixedly connected with the sleeve pipe and movably connected with the third connecting rod through the second rotary shaft, and the third connecting rod is movably connected with the blade through the third rotary shaft, which is also convenient for the blade to drive the column body to rotate.

In the above marine support column structure with power generation function, both sides of the flat surface of the blade are connected with both sides of the circular arc surface of the blade; a section of the blade is a quarter arc which forms an arched arc surface with a chord of the arc. The circular arc surfaces of the blades may be enclosed into a cylindrical surface. A section of the blade is an arc surface, and thus, the blades and the column body may be combined into a cylinder.

In the above marine support column structure with power generation function, a clamping groove for clamping an edge of the blade is disposed on the column body. The blade is fixed on the column body to ensure connection stability of the blades and the column body.

In the above marine support column structure with power generation function, a pin hole is disposed on the sleeve pipe and the column body respectively, and a shaft pin is inserted into two corresponding pin holes. The sleeve pipe and the column body are fixedly connected through the shaft pin and the pin hole to ensure synchronous rotation of the sleeve pipe and the column body.

In the above marine support column structure with power generation function, a shift switch for controlling relative rotation angles of the sleeve pipe and the column body is disposed on the sleeve pipe. The relative rotation angles of the sleeve pipe and the column body are controlled by the shift switch to adjust a rotation angle of the blade.

In the above marine support column structure with power generation function, a lower end of the power generator is fixedly connected with a guardrail on the ship hull, a cross bar is fixedly connected at an upper end of the guardrail, and the cross bar is movably mated with an upper end of the column body. When the blades are folded, the lower end of the column body is fixedly connected with the guardrail and the upper end of the column body is connected with the cross bar, so that the structure is enabled to serve as the guardrail. Further, the upper end of the column body is movably connected with the cross bar, thereby facilitating mounting and dismounting the structure.

Compared with the prior art, the present disclosure has the following advantages.

1. When the blades on the structure are unfolded, the structure can generate power under the action of the sea winds or waves, thereby fully utilizing the energies on the sea surface.

2. When the blades on the structure are folded, the blades and the column body may be combined into a cylinder that is connected with the guardrail to serve as a part of the guardrail.

Figure 1:
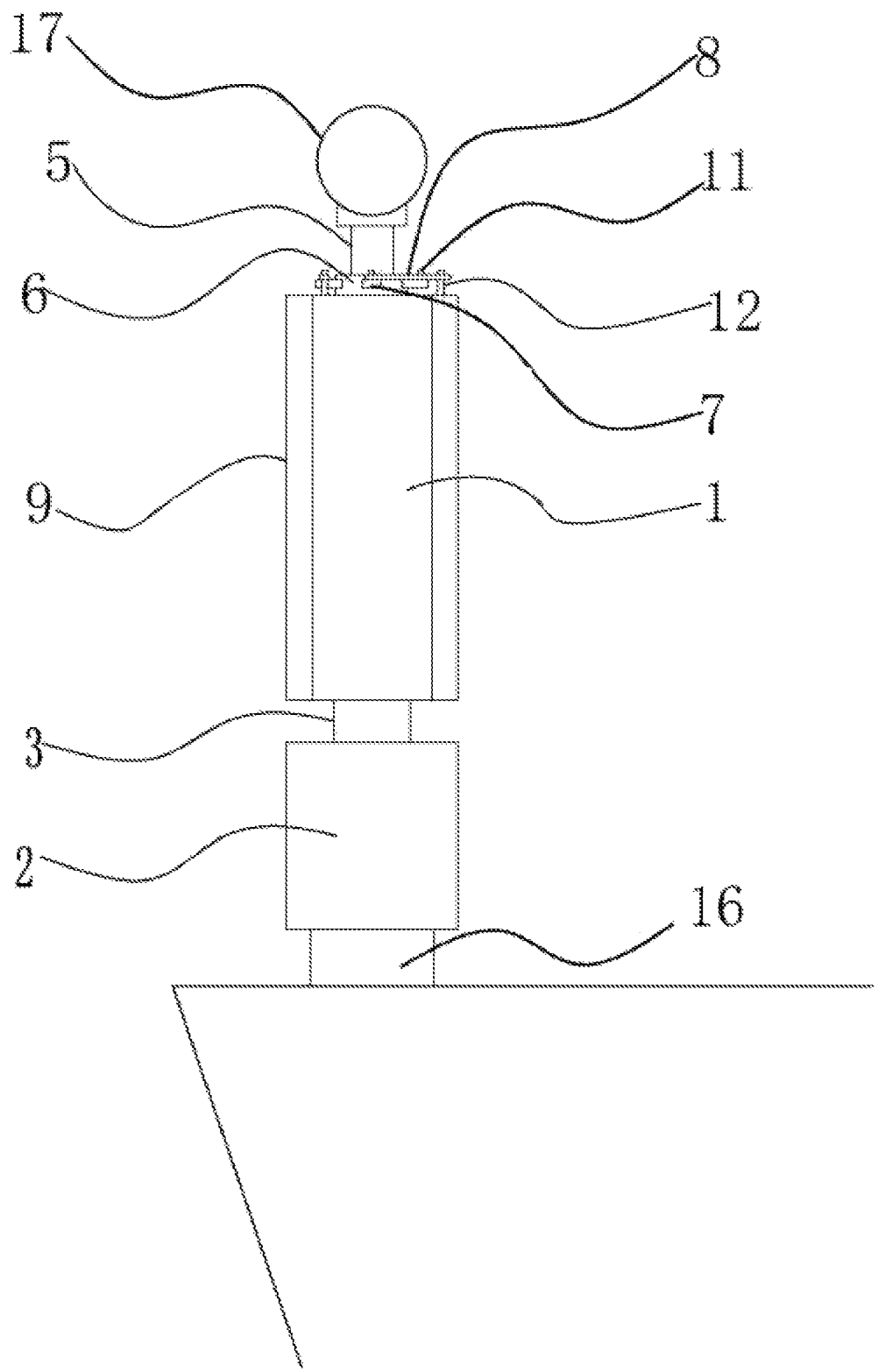
FIG. 1 is a schematic diagram illustrating a marine support column structure with power generation function according to an example of the present disclosure.

In the drawings, 1. column body, 2. power generator, 3. rotor shaft, 4. first connecting rod, 5. driving shaft, 6. sleeve pipe, 7. second connecting rod, 8. third connecting rod, 9. blade, 10. first rotary shaft, 11. second rotary shaft, 12. third rotary shaft, 13. clamping groove, 14. pin hole, 15. shaft pin, 16. guardrail, and 17. cross bar.

DETAILED DESCRIPTION OF THE EMBODIMENTS

Specific implementations of the present disclosure are further described in detail below in combination with specific examples of the present disclosure and accompanying drawings. However, the present disclosure is not limited to the following examples.

Example 1

Figure 2:
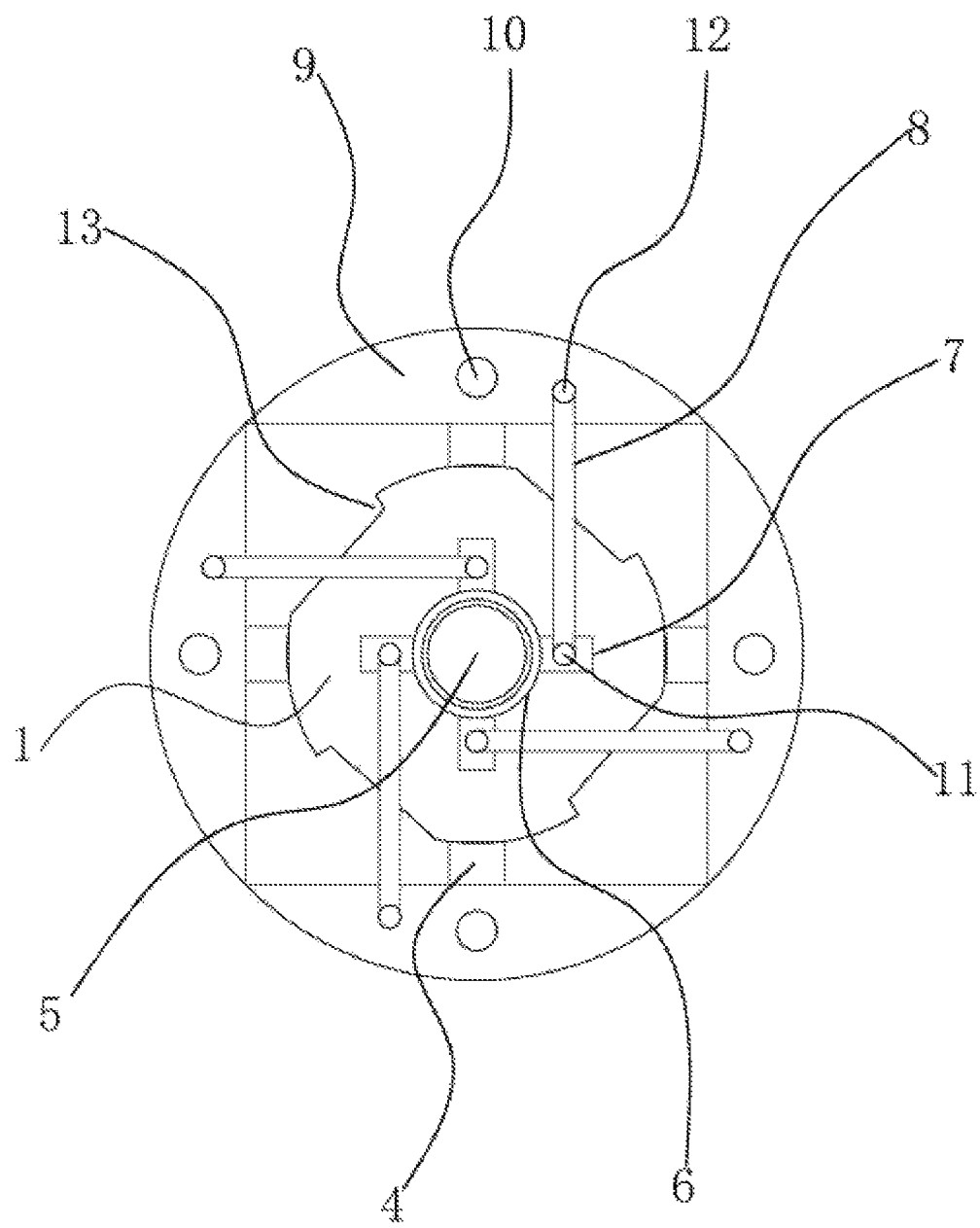
FIG. 2 is a schematic diagram illustrating one end of a column body in the support column structure according to an example of the present disclosure.

As shown in FIG. 1 and FIG. 2, a marine support column structure with power generation function includes a column body 1. A power generator 2 having a rotor shaft 3 is disposed at one end of the column body 1, an end of the rotor shaft 3 and one end of the column body 1 are fixedly connected to allow the rotor shaft 3 and the column body 1 to be coaxially disposed, several first connecting rods 4 are disposed at one end of the column body 1 connected with the power generator 2 and disposed along a radial direction of the column body 1, and all of the first connecting rods 4 are distributed uniformly in a spacing along a circumferential direction of the column body 1. A driving shaft 5 is coaxially and fixedly connected at the other end of the column body 1, a sleeve pipe 6 is rotatably sleeved outside the driving shaft 5, and several second connecting rods 7 are distributed circumferentially and uniformly at an outer circumferential surface of the sleeve pipe 6 and disposed along a radial direction of the sleeve pipe 6. A third connecting rod 8 is movably connected at an outer end of each second connecting rod 7. Several strip-shaped blades 9 are distributed at an outer perimeter of the column body 1 along the circumferential direction of the column body 1, and a length direction of the blade 9 is consistent with an axial direction of the column body 1. An inner side surface of the blade 9 is a flat surface, and an outer side surface of the blade 9 is a circular arc surface. The circular arc surfaces of all blades 9 can be connected to enclose into a complete cylindrical surface. The number of the blades 9 is equal to the number of the first connecting rods 4 and the number of the third connecting rods 8, and the blade 9, the first connecting rod 4 and the third connecting rod 8 are disposed correspondingly, one end of the blade 9 is hinged with a corresponding first connecting rod 4, and the other end of the blade 9 is hinged with a corresponding third connecting rod 8. After being unfolded, the blades 9 are driven to rotate under the action of sea wind or waves, and a middle portion of the blade 9 drives the column body 1 to rotate through the first connecting rod 4. A side of the blade 9 drives the sleeve pipe 6 to rotate through the second connecting rod 7 and the third connecting rod 8, the sleeve pipe 6 drives the driving shaft 5 and the column body 1 connected with the driving shaft 5 to rotate, and the column body 1 drives the power generator 2 to generate power through the rotor shaft 3 connected thereto. When the blades 9 are folded, the circular arc surfaces thereon may be enclosed into a cylindrical surface. Therefore, the structure may convert wind energy or wave energy into electric energy.

Figure 3:
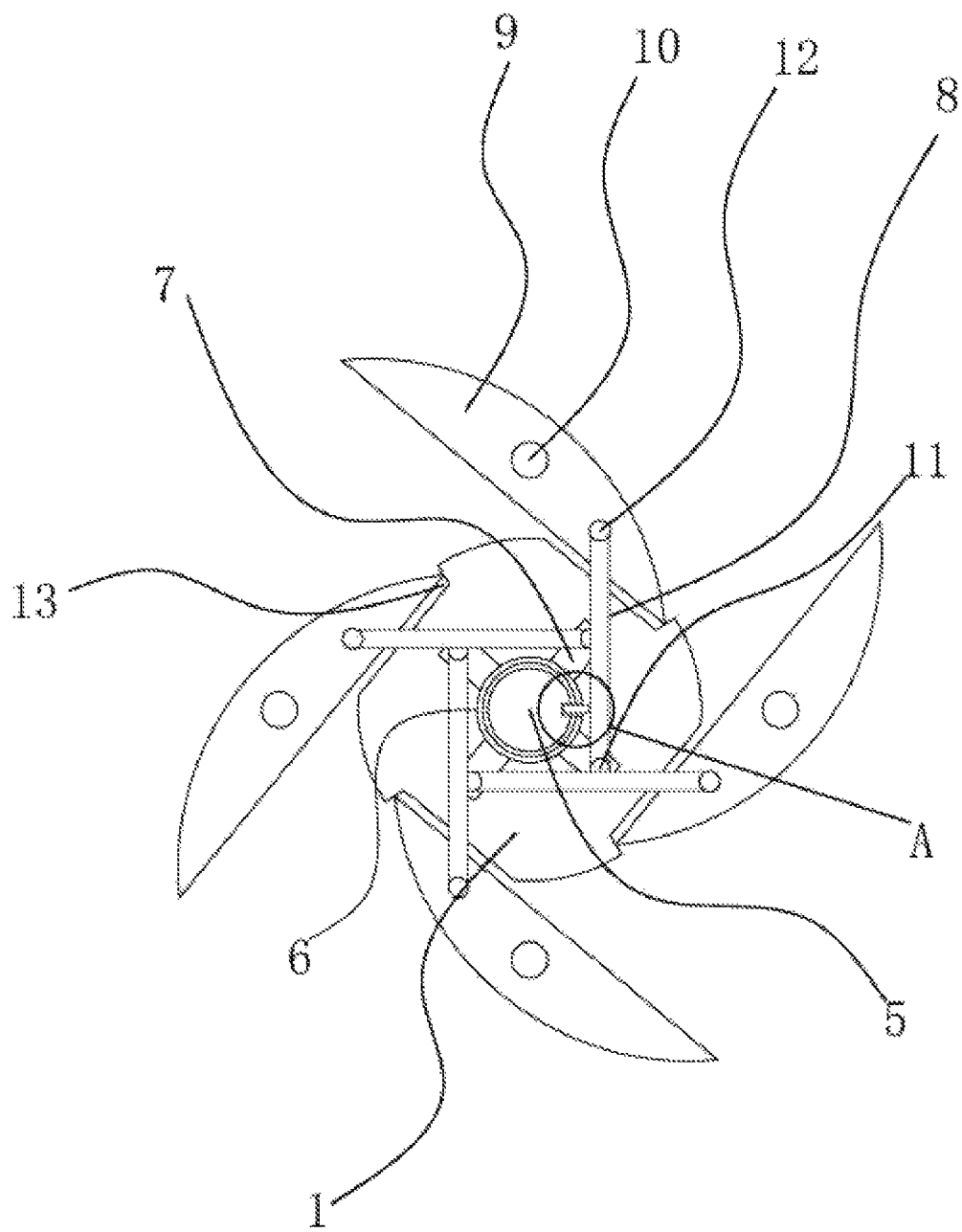
FIG. 3 is a structural schematic diagram when blades are unfolded according to an example of the present disclosure.
Figure 5:
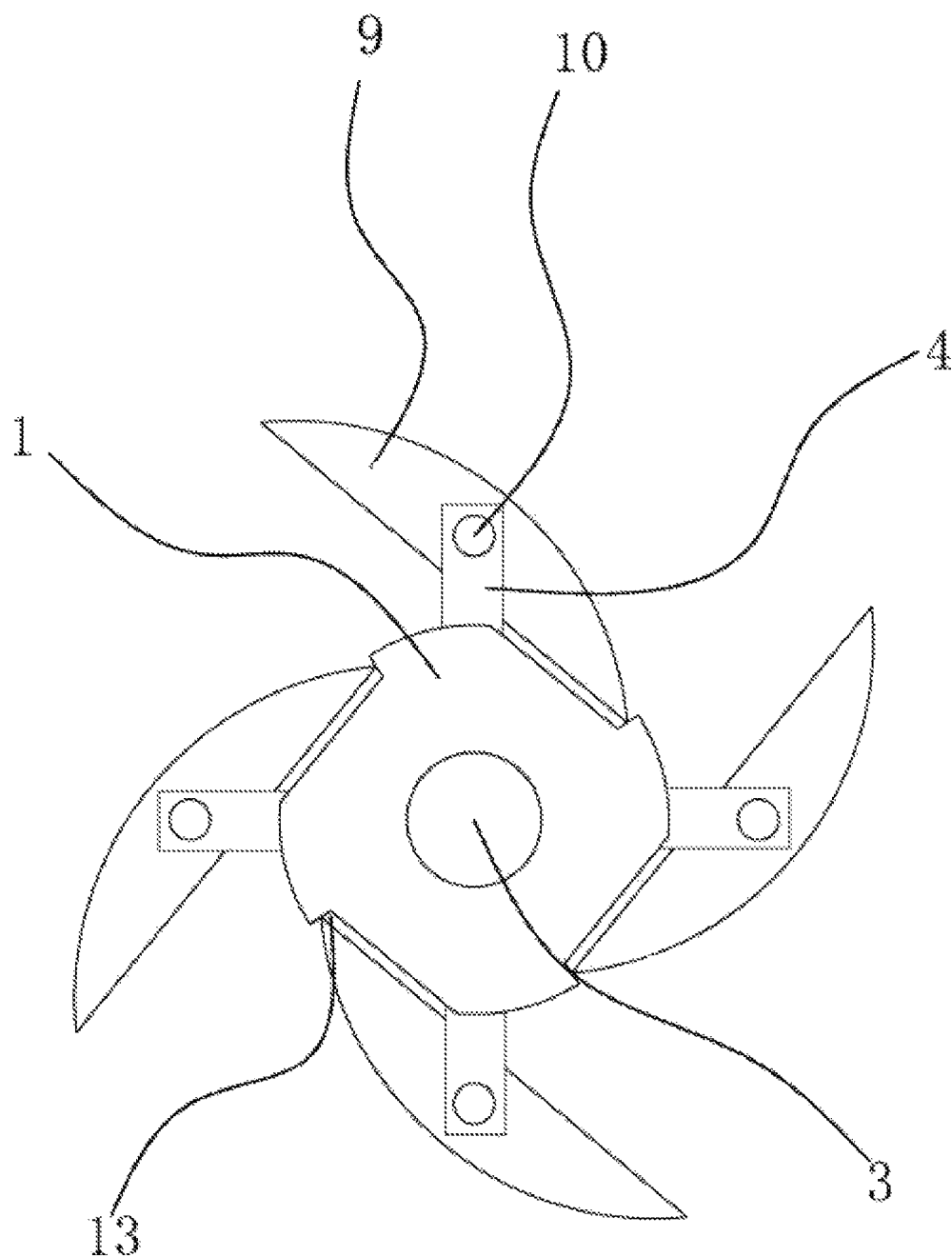
FIG. 5 is a schematic diagram illustrating the other end of a column body in the support column structure according to an example of the present disclosure.

As shown in FIG. 3 and FIG. 5, the number of the blades 9, the number of the first connecting rods 4 and the number of the third connecting rods 8 are all four, one end of the first connecting rod 4 is fixedly connected at an outer circumferential surface of the column body 1 close to an end, the other end of the first connecting rod 4 is rotatably connected on the blade 9 through a first rotary shaft 10, and the first rotary shaft 10 is located at a middle position of the blade 9 in a width direction. There are four second connecting rods 7 distributed uniformly in a spacing at the outer circumferential surface of the column body 1, an inner end of the second connecting rod 7 is fixedly connected with the sleeve pipe 6, and an outer end of the second connecting rod 7 is pivotally connected with one end of the third connecting rod 8 through an inserted second rotary shaft 11. The other end of the third connecting rod 8 is movably connected with the blade 9 through a third rotary shaft 12 located close to a side of the blade 9 in the width direction. Both sides of the flat surface of the blade 9 are connected with both sides of the circular arc surface of the blade 9. A section of the blade 9 is a quarter arc and forms an arched arc surface with a chord of the arc. A clamping groove 13 for clamping an edge of the blade 9 is disposed on the column body 1, and the blade 9 is connected with the column body 1 through the clamping groove 13. When the blades 9 are folded, the blades 9 and the column body 1 may be combined into a cylinder. The middle portion of the blade 9 is connected with the first connecting rod 4 through the first rotary shaft 10, and the first connecting rod 4 is connected with the column body 1. One side of the blade 9 is connected with the third connecting rod 8 through the third rotary shaft 12, the third connecting rod 8 is connected with the second connecting rod 7 through the second rotary shaft 11, and the second connecting rod 7 is connected with the column body 1. The disposal of the connecting rods and the rotary shafts facilitates transmitting the motion of the blades 9 to the column body 1.

Figure 4:
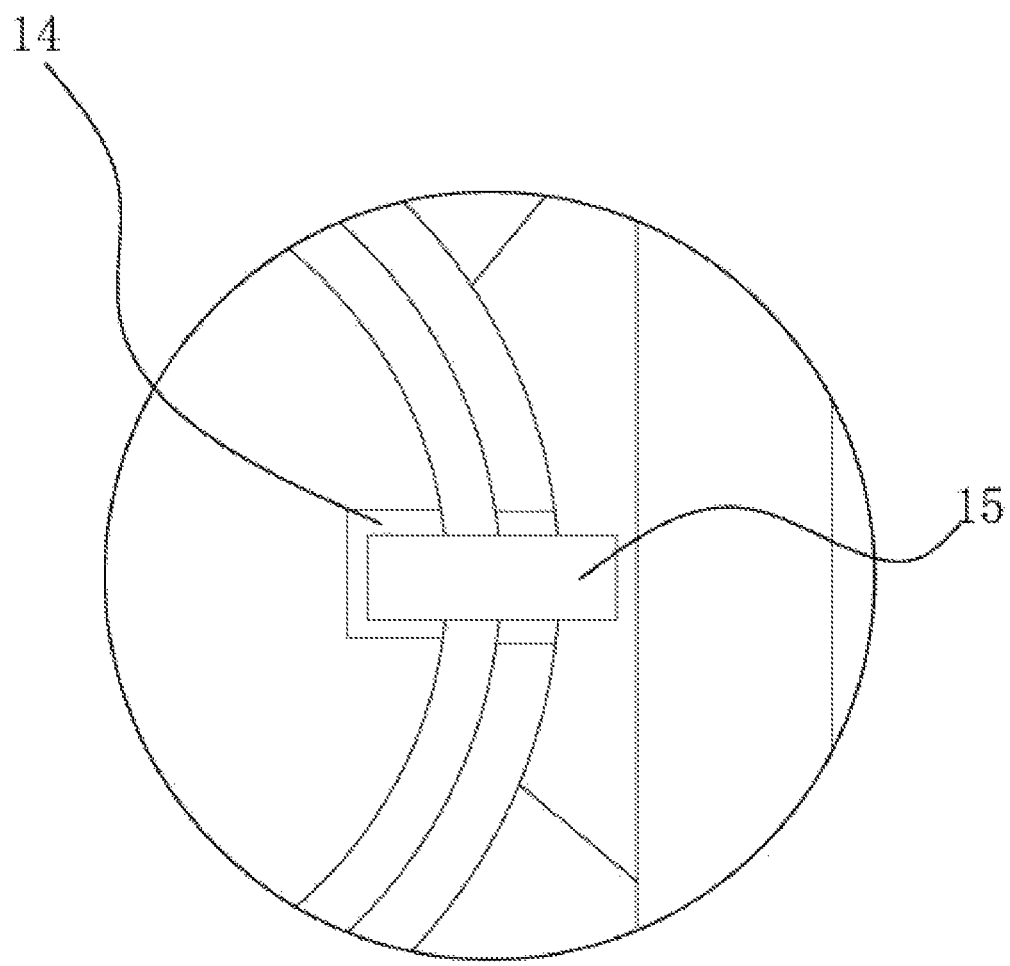
FIG. 4 is an enlarged view of a structure at A in FIG. 3.

Further, as shown in FIG. 4, a pin hole 14 is disposed on the sleeve pipe 6 and the column body 1 respectively, and a shaft pin 15 is inserted into two corresponding pin holes 14. A shift switch for controlling relative rotation angles of the sleeve pipe 6 and the column body 1 is disposed on the sleeve pipe 6. The shaft pin 15 are inserted into the pin holes 14 on the sleeve pipe 6 and the column body 1, and the shift switch on the sleeve pipe 6 controls the rotation angles of the sleeve pipe 6 and the column body 1. The sleeve pipe 6 drives the column body 1 to rotate, and the shift switch may change a rotation angle of the blade 9 by changing the rotation angles of the sleeve pipe 6 and the column body 1.

Example 2

This example is substantially same as the first example in structure, but differs from the first example in the followings: the lower end of the power generator 2 is fixedly connected with a guardrail 16 on the ship hull, the upper end of the guardrail 16 is fixedly connected with a cross bar 17, and the cross bar 17 is movably mated with an upper end of the column body 1. The power generator 2 and the column body 1 are connected with the guardrail 16 and the cross bar 17 respectively. When the blades 9 are folded, the device may be used as a part of the guardrail; when the blades 9 are unfolded, the blades 9 are rotated under the action of sea wind to drive the column body 1, so as to drive the power generator 2 to generate power.

The specific examples described herein are merely illustrative of the spirit of the present disclosure. Persons skilled in the art may make various modifications or supplementations or substitutions in a similar manner to the described specific examples without departing from the spirit of the present disclosure or surpassing the scope defined in the appended claims.

Although the terms such as 1. column body, 2. power generator, 3. rotor shaft, 4. first connecting rod, 5. driving shaft, 6. sleeve pipe, 7. second connecting rod, 8. third connecting rod, 9. blade, 10. first rotary shaft, 11. second rotary shaft, 12. third rotary shaft, 13. clamping groove, 14. pin hole, 15. shaft pin, 16. guardrail and 17. cross bar are used repeatedly herein, the possibility of using other terms is not excluded. These terms are merely used to describe and explain the essence of the present disclosure more conveniently, and it is contrary to the spirit of the present disclosure that these terms are interpreted as any additional limitation.

We claim:

1. A marine support column structure with power generation function comprising a column body (1), wherein a power generator (2) having a rotor shaft (3) is disposed at one end of the column body (1), an end of the rotor shaft (3) and one end of the column body (1) are fixedly connected to allow the rotor shaft (3) and the column body (1) to be coaxially disposed, at least one first connecting rods (4) are disposed at one end of the column body (1) connected with the power generator (2) and disposed along a radial direction of the column body (1), and all of the first connecting rods (4) are distributed uniformly in a spacing along a circumferential direction of the column body (1); a driving shaft (5) is coaxially and fixedly connected at the other end of the column body (1), a sleeve pipe (6) is rotatably sleeved outside the driving shaft (5), and at least one second connecting rods (7) are distributed circumferentially and uniformly at an outer circumferential surface of the sleeve pipe (6) and disposed along a radial direction of the sleeve pipe (6); at least one third connecting rod (8) is movably connected at an outer end of each second connecting rod (7); at least one strip-shaped blades (9) are distributed at an outer perimeter of the column body (1) along a circumferential direction of the column body (1), and a length direction of the blade (9) is consistent with an axial direction of the column body (1); an inner side surface of the blade (9) is a flat surface, and an outer side surface of the blade (9) is a circular arc surface; the circular arc surfaces of all blades (9) are connected to enclose into a complete cylindrical surface; the number of the blades (9) is equal to the number of the first connecting rods (4) and the number of the third connecting rods (8) and the blade (9), the first connecting rod (4) and the third connecting rod (8) are disposed correspondingly, one end of the blade (9) is hinged with a corresponding first connecting rod (4), and the other end of the blade (9) is hinged with a corresponding third connecting rod (8); when the blades (9) are folded, the blades (9) and the column body (1) are combined into a cylinder that is connected with a guardrail (16) on a ship hull and used as a part of the guardrail (16).

2. The marine support column structure with power generation function according to claim 1, wherein the number of the blades (9), the number of the first connecting rods (4) and the number of the third connecting rods (8) are all four, one end of the first connecting rod (4) is fixedly connected at an outer circumferential surface of the column body (1) close to the corresponding end, the other end of the first connecting rod (4) is rotatably connected on the blade (9) through a first rotary shaft (10), and the first rotary shaft (10) is located at a middle position of the blade (9) in a width direction.

3. The marine support column structure with power generation function according to claim 2, wherein the number of the second connection rods (7) is four and the four second connecting rods (7) distributed uniformly in a spacing at the outer circumferential surface of the sleeve pipe (6), an inner end of the second connecting rod (7) is fixedly connected with the sleeve pipe (6), and an outer end of the second connecting rod (7) is pivotally connected with one end of the third connecting rod (8) through an inserted second rotary shaft (11); the other end of the third connecting rod (8) is movably connected with the blade (9) through a third rotary shaft (12), and the third rotary shaft (12) is located close to one side of the blade (9) in the width direction.

4. The marine support column structure with power generation function according to claim 1, wherein both sides of the flat surface of the blade (9) are connected with both sides of the circular arc surface of the blade (9); a section of the blade (9) is a quarter arc and forms an arched arc surface with a chord of the arc.

5. The marine support column structure with power generation function according to claim 1, wherein a clamping groove (13) for clamping an edge of the blade (9) is disposed on the column body (1).

6. The marine support column structure with power generation function according to claim 1, wherein a pin hole (14) is disposed on the sleeve pipe (6) and the column body (1) respectively, and a shaft pin (15) is inserted into two corresponding pin holes (14) respectively.

7. The marine support column structure with power generation function according to claim 6, wherein a shift switch for controlling relative rotation angles of the sleeve pipe (6) and the column body (1) is disposed on the sleeve pipe (6).

8. The marine support column structure with power generation function according to claim 1, wherein a lower end of the power generator (2) is fixedly connected with the guardrail (16) on the ship hull, a cross bar (17) is fixedly connected at an upper end of the guardrail (16), and the cross bar (17) is movably mated with an upper end of the column body (1).

* * * * *